(12) United States Patent
Allard

(10) Patent No.: US 6,535,793 B2
(45) Date of Patent: *Mar. 18, 2003

(54) METHOD AND SYSTEM FOR REMOTE CONTROL OF MOBILE ROBOT

(75) Inventor: James R. Allard, Newton, MA (US)

(73) Assignee: iRobot Corporation, Burlington, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/846,756

(22) Filed: May 1, 2001

(65) Prior Publication Data

US 2001/0037163 A1 Nov. 1, 2001

Related U.S. Application Data

(60) Provisional application No. 60/201,054, filed on May 1, 2000.

(51) Int. Cl.$^7$ ................................................ G05B 15/00
(52) U.S. Cl. .................. 700/259; 700/245; 700/248; 318/628; 600/595; 434/262; 434/267; 345/156; 345/184
(58) Field of Search .................... 700/245, 259, 700/260, 248; 434/262, 267; 600/595; 318/628; 345/156, 184

(56) References Cited

U.S. PATENT DOCUMENTS

| | | | | |
|---|---|---|---|---|
| 4,202,037 A | * | 5/1980 | Glaser et al. | ................ 345/354 |
| 5,471,560 A | * | 11/1995 | Allard et al. | ................. 706/59 |
| 5,511,147 A | | 4/1996 | Abdel-Malek | |
| 5,652,849 A | | 7/1997 | Conway et al. | |
| 5,675,229 A | | 10/1997 | Thorne | |
| 5,984,880 A | * | 11/1999 | Lander et al. | ............... 600/595 |
| 6,088,020 A | * | 7/2000 | Mor | ........................... 345/156 |
| 6,108,031 A | * | 8/2000 | King et al. | ................. 348/118 |
| 6,113,395 A | * | 9/2000 | Hon | ............................ 434/262 |
| 2001/0020200 A1 | * | 9/2001 | Das et al. | .................... 700/260 |
| 2001/0025118 A1 | * | 9/2001 | Shahidi | ....................... 600/130 |

FOREIGN PATENT DOCUMENTS

| | | |
|---|---|---|
| DE | 34 04 202 A | 5/1987 |
| GB | 2 128 842 A | 5/1984 |
| JP | 11149315 A | 6/1999 |
| JP | 2000094373 | 4/2000 |
| WO | WO 99/05580 A1 | 2/1999 |

OTHER PUBLICATIONS

Nakai et al., 7 DOF Arm type haptic interface for teleoperation and virtual reality systems, 1998, IEEE, pp. 1266–1271.*
Ohashi et al., The sensor arm and the sensor glove II–Haptic devieces for VR interface, 1999, IEEE, p. 785.*
IRobot Corporation, Coworder, no date, Internet.*
Greham, March of the robots, 2002, Internet, pp. 175–185.*
Star Tech, Tech firms showing off gadgets for consumers, no date, Internet.*
IRobot Corporation, Introducing the IRobot–LE, 2000, Internet, pp. 1–3.*
Corbett et al. "A Human Factors Tested for Ground–Vehicle Telerobotics Research," IEEE Proceedings –1990 Southeastcon pp. 618–620 (US).*
"Tactical Robotic Vehicle Aids in Battlefield Surveillance" 2301 NTIS Tech Notes, Dec. 1990, Springfield, VA (US) p. 1061.*

* cited by examiner

Primary Examiner—William A. Cuchlinski, Jr.
Assistant Examiner—McDieunel Marc
(74) Attorney, Agent, or Firm—Glen D. Weinstein, Esq.; Lucash, Gesmer & Updegrove, LLP

(57) ABSTRACT

Methods of remote control of a mobile robot and an intuitive user interface for remotely controlling a mobile robot are provided. Using a point-and-click device (405), the user is able to choose a target location (430) within a heads-up display (400) toward which to move a mobile robot. Additional graphical overlays (410 & 412) are provided to aid the user in navigating even in systems with asynchronous communication.

23 Claims, 12 Drawing Sheets

METHOD AND SYSTEM FOR REMOTE CONTROL OF MOBILE ROBOT

CITATION OF PROVISIONAL APPLICATION

This application for U.S. patent is a non-provisional conversion of U.S. provisional application for patent Serial No. 60/201,054 filed May 1, 2000.

FIELD OF THE INVENTION

The present invention relates generally to the remote control of a mobile robot, and deals more particularly with methods of and systems for tele-operating a robot with an intuitive graphical interface.

BACKGROUND

This invention has utility with the remote control of a wide variety of tele-operated robots and vehicles. While the description provided herein describes the methods and systems of the present invention in relationship to a specific mobile robot, the invention is not so limited. One of skill in the art will recognize that the methods and systems described herein have broad applicability for the remote control of robotic devices.

As robots become increasingly common and capable, there will be an increasing need for an intuitive method of and system for remotely controlling the robots. For example, users may have remote access to robots with which they are otherwise unfamiliar. Just as a licensed driver feels comfortable operating a rental car she has never before encountered, so should she feel comfortable remotely operating an unfamiliar robot; to date, this has not been possible.

While in many situations a robot can be operated locally with the user in visual contact with the robot, in many other situations it is advantageous to have the robot tele-operated. For example, in situations where the robot must operate in hazardous or dangerous conditions—e.g., the transport of hazardous materials, search and rescue operations, military and law enforcement applications—tele-operation of the robot is particularly beneficial.

In some existing systems, a camera is carried by a robot and pictures of the view seen by the camera are transmitted by a communications link to a remote control station and reproduced there on a display screen to give the operator some visual information on the vehicle's environment. In yet other existing systems, users painstakingly build maps or detailed floor plans of the robot's environment in order to remotely navigate. Because of compounding errors generated by such systems, these systems are often inadequate.

The most difficult systems to use are interfaces in which the user specifies a velocity, effectively using a joystick-like interface. This approach suffers over communications lines, since there is a time lag between when a picture is taken and when a user can see it, and again there is a time lag between when a user stops a movement with a joystick and when that command is received by the robot. Typically this kind of interface suffers from "overshooting," where the user stops commanding a motion when hey see the image that shows the robot at its desired location. However, since that image as aged, the robot has already actually overshot the desired location. Since the command to stop moving also takes time to arrive at the destination, the robot continues to overshoot while this command is in transit.

One solution to the overshooting problem is the inclusion of simple, clickable arrows on an interface to command a fixed amount of movement by specifying travel time or distance. This simple interface has the desirable characteristic that it provides an absolute motion command to the robot which will not suffer from time lag issues; however, this interface provides limited functionality.

Yet another possible solution includes using fixed cameras that point to an immovable target and then allowing a user to select locations for a robot to move to within the fixed image. This solution lacks the ability to arbitrarily position and rotate the camera in three-dimensional space. In addition, this solution requires placing cameras in all locations to which the robot can travel, and therefore is an inflexible and expensive solution.

Because existing systems are often difficult to control, additional solutions have been proposed. For example, in U.S. Pat. No. 6,108,031, a user is given "virtual reality" glasses (or a headset) to allow three-dimensional information to be transmitted to the user. Using this enhanced visual information, the user then remotely manipulates the vehicle using a control box.

There are, however, limitations to these methods of remotely controlling a robot or vehicle. As mentioned above, in many of these cases, it is assumed that real-time visual information is being transmitted from the camera to the user and that the user is able to transmit real-time control information back to the robot. For certain types of communication links, however, such real-time communication is not possible. Specifically, Internet connections can vary dramatically by the speed of the connection (e.g. DSL, cable modem, dial-up connections) and by the current level of Internet traffic. Therefore, for Internet-connected robots, such real-time transmission cannot be guaranteed.

SUMMARY OF THE INVENTION

The object of the invention is, therefore, to provide a method for the intuitive tele-operation of a robot.

Another object of the invention is to provide an intuitive user interface for remotely-controlling a robot.

Yet another object of the invention is to provide a method and system for remotely controlling a robot particularly suited for systems with asynchronous communication.

It is an object of the invention to provide additional information to the user in a graphical overlay to improve navigation of a remotely controlled robot.

Other objects and advantages of the invention will be apparent from the following description of a preferred embodiment of the invention and from the accompanying drawings and claims.

DETAILED DESCRIPTION OF THE PREFERRED EMBODIMENT

For purposes of this detailed description, first, the hardware of the preferred embodiment will be described; second, a detailed description of the preferred embodiment of the user interface is provided; third, the method of operating the present invention is discussed; and finally, the necessary computational details of the system and methods are provided.

1. Hardware of the Preferred Embodiment

Figure 1:
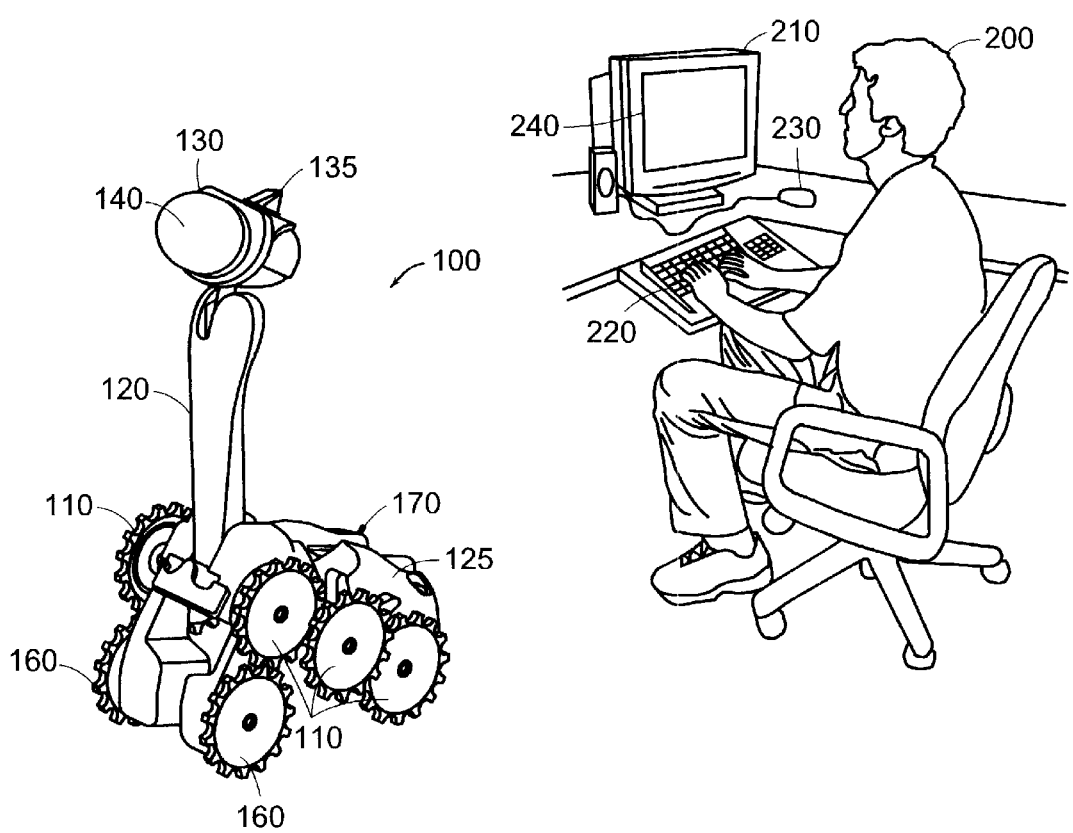
FIG. 1 depicts a mobile robot that can be controlled by a remote user and the remote user and the preferred control means.

FIG. 1 depicts a mobile robot 100 that can be controlled by a remote user 200 from a personal computer 210. For purposes of describing all possible functionality of the present invention, the robot described herein includes several relevant features.

The robot of the preferred embodiment comprises wheels 110 to allow the robot to move in all directions, including the ability to turn within a specified turning radius. In this preferred embodiment, one set of wheels 160 are mounted to a forward portion of the chassis by a hinge or flexure as to allow the robot to be raised or lowered by the operation of this "flipper." The design shown represents a robot similar to the iRobot-LE, a robot produced by iRobot Corporation of Somerville, Mass., and disclosed in detail in U.S. patent application Ser. No. 09/826,209 and is incorporated by reference herein. This design allows the robot 100 to turn in place, which has obvious advantages and is utilized in the methods of the preferred embodiment. One of skill in the art will recognize that the robot can be configured in numerous ways and comprise any number of varying mobility platforms including wheels in any configurations, tracks, arm linkages or a combination thereof.

The robot 100 must also contain one or more sensors able to gather information about the robot's environment and a means of transmitting the information to the remote user 200. In the robot used in the preferred embodiment of the present invention the primary sensor comprises a video camera 140 mounted above the body 125 (or chassis) of the robot. The robot of the preferred embodiment uses a miniaturized camera 140 that produces a standard NTSC output signal, which is then digitized using an off the shelf frame grabber card. This camera could be any such device that eventually provides an image within the user interface of the end-user, such as a USB or FireWire camera, or a camera that uses analog transmission to the remote end user 200. The camera mounting may be rigid relative to the chassis or the camera may be mounted on an "arm" or "neck" 120 able to move with one, two, three or more degrees of freedom relative to the robot chassis 125. In the preferred embodiment, the camera 140 is mounted within a head 130, which sits upon a neck 120. The neck 120 pivots about a point within the robot's chassis 125 and has one degree of freedom.

In addition, in the preferred embodiment, the camera unit itself has pan 150, tilt 160 and zoom controls. In addition, the robot 100 also has a spinning sonar scanner 135 mounted atop the robot's head 130, and various infrared emitters and detectors located within the robot body 125 but not shown. In a preferred embodiment, infrared emitter and detector pairs would be located such as to provide 360 degree coverage around the robot chassis 125.

Figure 2:
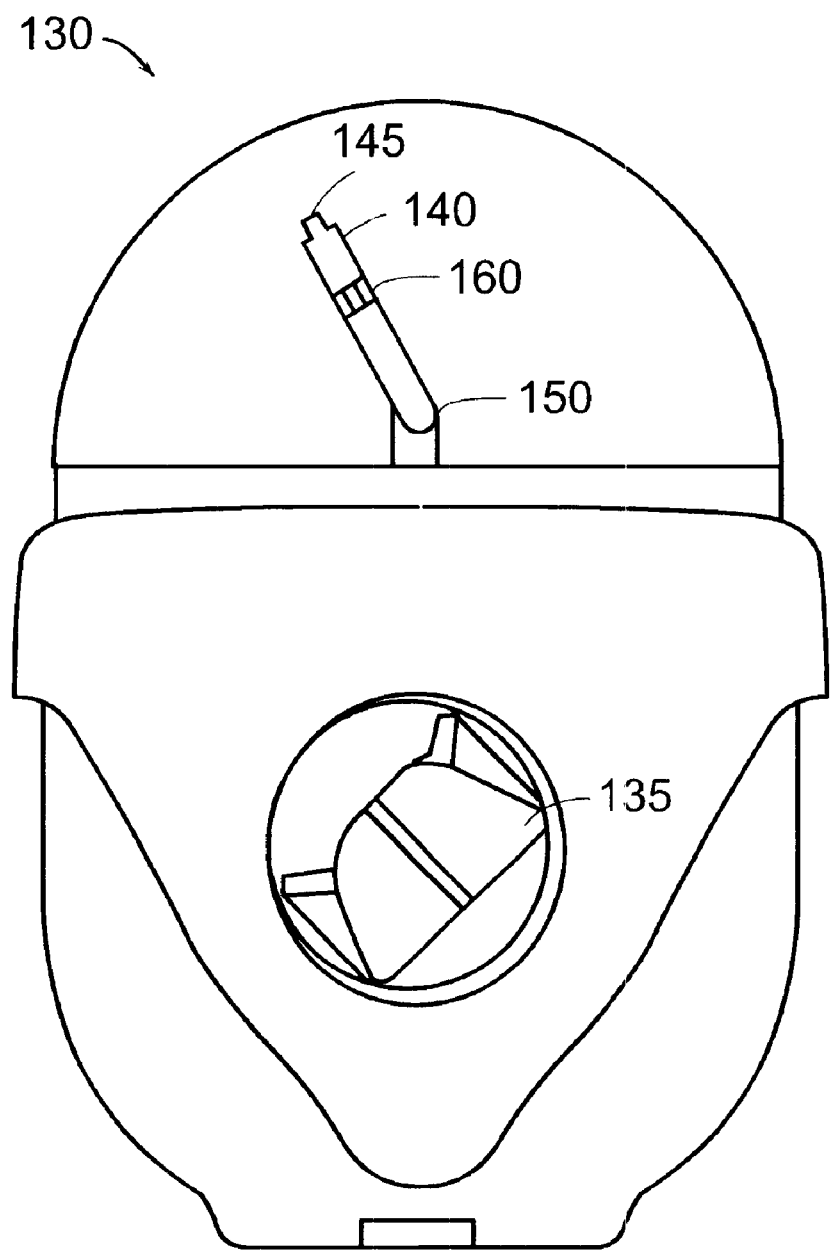
FIG. 2 shows a enlarged top-view of the head/camera of the mobile robot.

FIG. 2 shows an enlarged top-view of the head 130 of the robot 100 of the preferred embodiment. The head 130 contains a camera 140, with a camera lens 145 (assumed to be a pinhole), connected to motorized linkages for controlling pan 150 and a motor for controlling tilt 160. One of skill in the art will recognize that the robot may contain any number of sensors, including sonar transducers and receivers, laser scanners, radar, infrared cameras, stereo vision, motion detectors, omnicams and other similar devices.

In the preferred embodiment, the means for transmitting information to the user is a wireless Internet link through antenna 170. The robot's link to the Internet can be direct through a wireless modem or first through a wireless transmission (for example, Home RF or IEEE 802.11) to a stationary computer connected to the Internet. While the above is the preferred embodiment, another approach would be to use a low speed digital radio link between the robot and the stationary computer, such as Bluetooth or a serial radio modem, and then also broadcast analog video and sound from the robot to analog video receivers near the stationary computer. The stationary computer's audio-in jacks and inexpensive USB frame grabbers connected to the stationary computer can then be used to acquire audio and video from the robot. In other embodiments, an audio link from the Internet over the digital wireless radio from the end-user to the robot can be used. In the alternative, an analog audio broadcaster connected to the audio-out jack on the stationary computer can be used, the signals from which are received by a radio on the robot and played through speakers on the robot.

The protocols used over this wireless Internet link can include video teleconferencing protocols such as H261, video protocols such as MJPEG, and audio encoding such as GSM. These can either run directly over the wireless link or be piggybacked onto protocols such as HTTP, HTTPS, or a special purpose protocol made for this task.

FIG. 1 also depicts the user 200 and a preferred embodiment of the control means. In FIG. 1, a user 200 communicates with the robot 100 through a personal computer 210 connected to the Internet. The personal computer comprises a computer monitor 240, keyboard 220 and mouse 230. One of skill in the art will recognize that the control means can be adapted to include any number of known computer input devices such as touch screens, joysticks, wireless controls, virtual reality headsets and sensor gloves. Furthermore, the user need not be in a location physically remote from the robot. When a user is physically close to the robot, additional controls can be used independently from the radio link, including buttons and controls directly on the robot or infra-red remote controls similar to a television remote control to give commands to the robot.

In the preferred embodiment, the control means comprises a user interface implemented to run on a standard web browser, which allows control of the robot from any Internet connected computer. In a preferred method of operating the robot, the user logs into a web browser and accesses a secure website by entering a user name and password. The user is then able to access a Java applet containing the user interface described herein. Another embodiment is to install a plug-in to a browser, enabling better performance in the application at the cost of requiring a software installation step on the end-user's personal computer. Yet another is to install a purpose built application containing the web-driving interface, with this application performing all the network operations required independently from any web browser on the end-user's personal computer.

2. Detailed Description of the User Interface

Before providing a detailed description of the method and system for tele-operating a robot, an explanation of a preferred embodiment of the user interface is provided.

Figure 3:
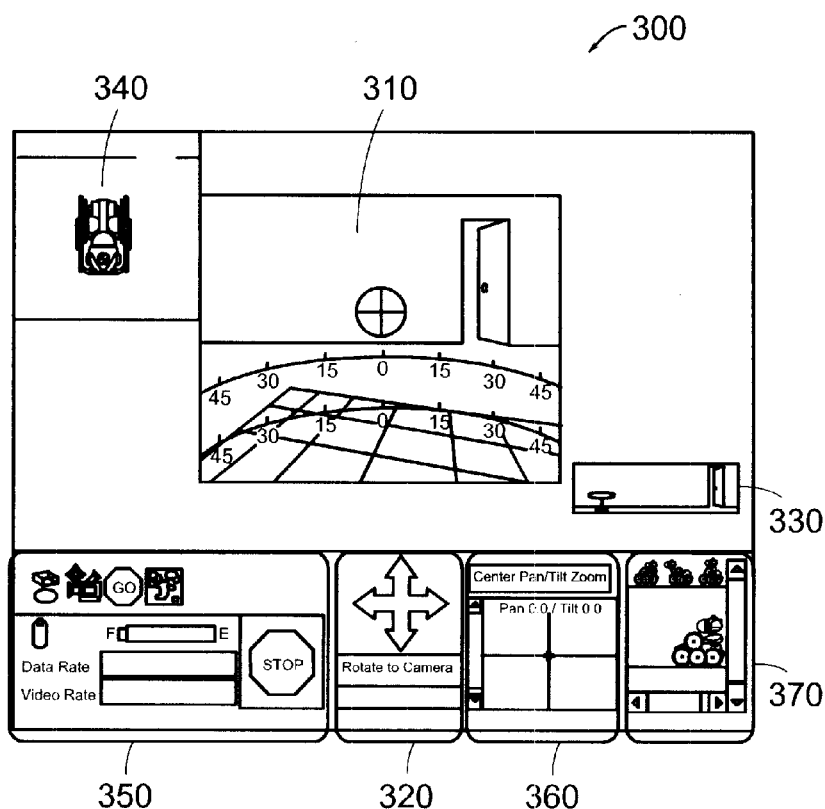
FIG. 3 depicts a preferred embodiment of the user interface for remotely controlling the robot.

FIG. 3 depicts a preferred embodiment of the user interface 300 for controlling the robot. The preferred embodiment of the user interface includes a heads-up display 310, a joystick or direct drive controls 320, a panorama display 330, an overhead map 340, a status bar 350, camera control 360, and head/neck controls 370. One of skill in the art will recognize that a user interface can be designed to meet the particular needs of the user, altering both the content of the user interface and the placement of any element within the display. Each of these elements shown in FIG. 3 is discussed in greater detail below, and shown in greater detail in FIGS. 4–10.

The only portion of the user interface necessary to practice the preferred embodiment of the present invention is the heads-up display 310. The heads-up display 310 continuously shows the most recent camera image received from the robot. In the preferred embodiment, a number of computer-generated images are overlaid on top of the camera image, including a camera reticle 312, a floor plane grid 314, and rotation tapes 316 and 318. As discussed below, other heads-up display overlays (for example, targeting circles and the perspective box) are used once the curser is placed within the heads-up display 310 for the purpose of aiding a user in selecting a target location or waypoint.

In the preferred embodiment, two rotation tapes 316 and 318 appear within the heads-up display. The rotation tapes 316 and 318, which indicate degrees of rotation relative to the robot (as opposed to the camera), provide additional visual information to the user to aid in remotely controlling the robot. In the preferred embodiment, rotation tape 316 is drawn at a distance of one meter in front of the robot's chassis 125 and rotation tape 318 is drawn at a distance of two meters.

In certain embodiments, on or near the heads-up display, a tape, marked in degrees, can be used to command a rotation. The degree markings on the rotation tapes line up with the degrees of rotation within the image so that clicking on a portion of the tape just below an item in the image will cause the robot to rotate so as to target the robot's reticle on the item in the image. In still other embodiments, just in from both edges of the image, the markings on the tape can go non-linear and rapidly count up to 180 degrees of rotation. An indicator can also be placed dead center showing rotation. While the robot is in drive mode and currently has an empty waypoint list, if you click onto the tape, a target indicator will be shown, and the robot will rotate to that heading. As it rotates, the target will slide towards the center, continuously showing the remaining rotation.

Finally, it should be noted that the content of the heads-up display 310 need not be video from a camera. For example, in a system designed for operation in the absence of light (e.g. a system for underwater or mine exploration) the heads-up display can contain a graphical representation of three-dimensional sonar or radar imaging.

Figure 7:
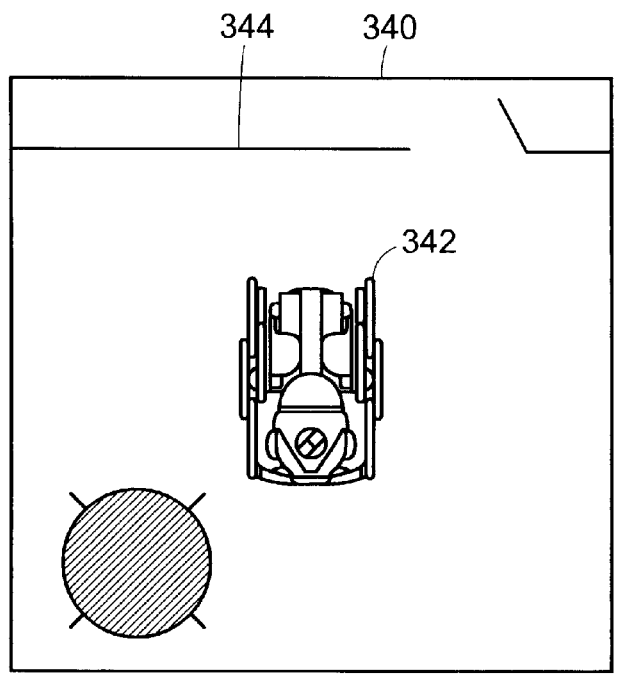
FIG. 7 depicts the detail of the overhead map portion of the user interface.

As seen in FIG. 7, the preferred embodiment of the user interface 300 includes an overhead map 340. The overhead map 340 contains a representation of the robot 342 and additional graphical information about the robot's immediate surroundings. This display can either be a world-orientation based map (i.e. the robot rotates within it) or, as shown in FIG. 7, a map relative to the robot's orientation (i.e. the robot 342 always appears to be pointed in the same direction). This map can include waypoints and additional information such as architectural features such as a wall 344, previous path(s) traveled, direction vectors, etc.

In the preferred embodiment, the overhead map 340 contains graphical representation of signals received from the sonar scanner 135. In certain embodiments, the overhead map can be updated to show the aging of data received. For example, when first detected, echoes from the sonar scanner 135 are displayed in bright green, but as these signals age they are displayed in dark green. Likewise, infrared signals detected by infrared echoes are displayed in bright red and then go to dark red as they age and then disappear. The overhead display can also be used to show the current waypoints, the current direction and speed of the robot as an animated element on the display, and a trail of the recent locations where the robot has been.

Figure 5:
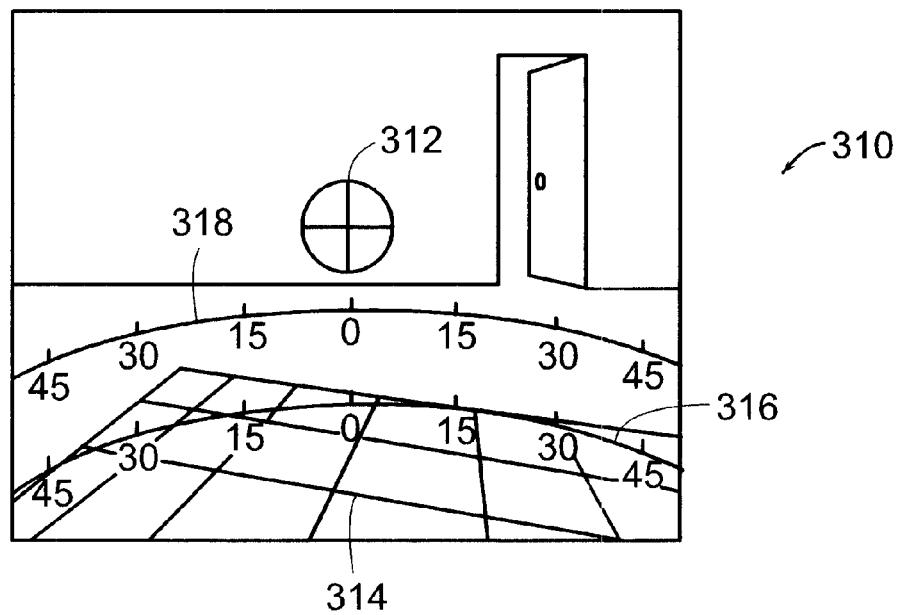
FIG. 5 depicts the detail of the movement control or joystick portion of the user interface.

The user interface 300 can also include a means for controlling the movement of the robot 100 without creating waypoints. In FIG. 5, for example, the preferred embodiment of the present invention includes a joystick 320, represented by a four-arrow icon, made up of four buttons (left, right, forward and backward). While the robot is in drive mode, for every click on an up (forward) or down (backward) arrowhead, the robot will move a preset distance (e.g. 0.1 m) in the selected direction. For each click on the right or left arrowhead, the robot will rotate a preset angle (e.g. 5 degrees) in the selected direction. In the preferred embodiment, the corresponding arrow keys on the computer keyboard will also cause identical movement. One of skill in the art will recognize that many control interfaces for movement of the robot can be utilized alone or in various combinations. For example, separate buttons can be created to move the robot to specific locations ("go to living room") or to move the robot in specific patterns ("go two meters forward, then turn 45 degrees to the left"). In addition, a button 325 can be used to automatically have the robot rotate to the angular direction in which the camera is currently pointed.

Figure 6:
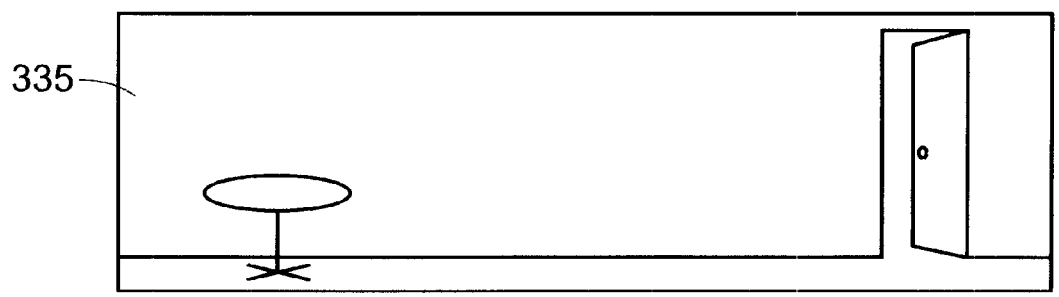
FIG. 6 depicts the detail of the panorama display portion of the user interface.

In certain embodiments, the user interface 300 may include one or more panorama displays 330, as seen in FIG. 3 and FIG. 6. In certain embodiments of a robot 100, a camera such as an omnicam is rotatably mounted on the robot and is able to capture images in 360 degrees without requiring. the robot to turn in place. In other embodiments the robot can turn in place in order to capture 360 degree images.

Where such functionality is available, an area of the user interface may be dedicated to displaying panoramic views. Each panorama image is actually a sequence of photographs from the camera displayed in close proximity. In certain embodiments, the user may request the robot to capture a panoramic image. In other embodiments, a dedicated portion of the user interface can be used to store selected camera (non-panoramic) images. FIG. 6 shows a sample panoramic view, including a doorway and a lamp 335. These same features are visible in sonar images shown in FIG. 7, which provides an indication of the relationship between the global locations of objects (as in FIG. 7) and their appearance in a panoramic view..

Figure 8:
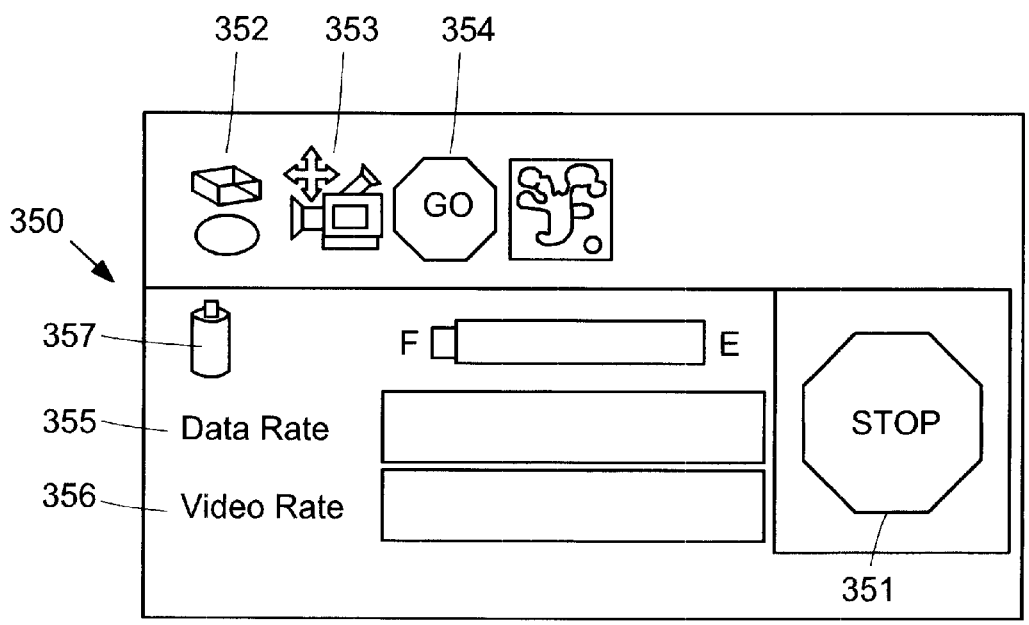
FIG. 8 depicts the detail of the status bar or area portion of the user interface.

The preferred embodiment of the user interface 300 includes a status bar or status area 350, which contains various information and/or buttons controlling general functionality. For example, user interface 300 contains a status bar 350 in the lower left-hard corner of the interface 300. The details of a preferred embodiment of the status bar are shown in FIG. 8. This area includes a red stop button 351 that immediately causes the robot 100 to cease all movement. The status area 350 may also include some textual or iconic information regarding the robot's current mode. As discussed below, the modes might indicate the level of guarded motion and/or obstacle avoidance the robot is to use while seeking a target or waypoint. The modes can control either the robot motion, or the interpretation of user input within the user interface. One user interface mode would be to interpret mouse clicks at commands to the pan/tilt camera instead of commands to create new waypoints. Another mode might be to stop all motion and remain stopped until that mode is cleared. Another mode might be to override guarded motion and allow the robot to move towards a waypoint, even though the robot's sensors indicate that there is an obstacle in the way. The status area 350 also includes a green go button 354, which when pressed allows the robot to move even in the presence of a perceived obstacle.

The status area also includes a battery icon 357 which graphically displays the current battery level of the robot 100. In certain embodiments it is also useful to include an icon indicating when the battery needs to be charged, for example when the voltage drops below a pre-selected level, or the actual voltage levels. A separate icon can be used to indicate that the robot is currently being recharged.

Certain embodiments of the robot can also include information related to data transmissions rate 355 (e.g. 300 kilobytes per second) and video transmission rate 356 (e.g. 10 frames per second). Other displays could be included in this area to show the robot's current speed, current heading, within which room it is located, the number of users who are currently logged in to the robot, chat pages between users logged into the robot, or any other sensed or computed information delivered from the robot to the user interface.

Figure 9:
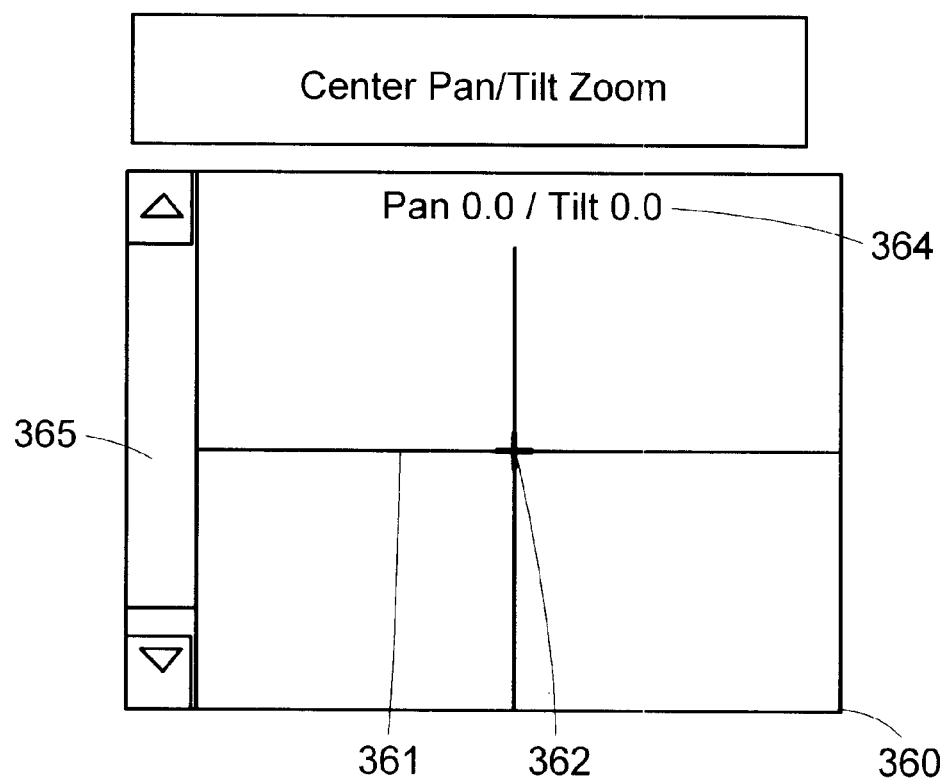
FIG. 9 depicts the detail of the camera control portion of the user interface.

As seen in detail in FIG. 9, the user interface 300 also includes camera controls 360 tailored to the specifics of the robot's camera 140. In the preferred embodiment, the camera 140 contains pan, tilt and zoom controls, therefore it is preferable to allow the remote user 200 to control the camera 140 as desired. The preferred embodiment of the present invention includes a two-dimensional grid 361 for selecting the pan and tilt of the camera. In the preferred embodiment, the current location of the camera is represented y a curser 362 within the grid 361 and also displayed numerically in the top portion of the field 364. The pan/tilt curser 362 can be moved by using the mouse 230 to click within the grid 361 which will immediately adjust the camera 140 to the newly selected location. Additionally, a slide bar 365 control is placed to the left of the pan-tilt grid 361 to control the zoom of the camera. One of skill in the art will recognize that any number of controls (keypad entry, slide bars, rotational knobs, etc.) can be used to control the position and focal distance for the camera or other sensing device. In the preferred embodiment, a jump back feature is used in which the pan/tilt angles are reset to the center and the camera zoom is reset to wide angle whenever a new waypoint is created.

Figure 10:
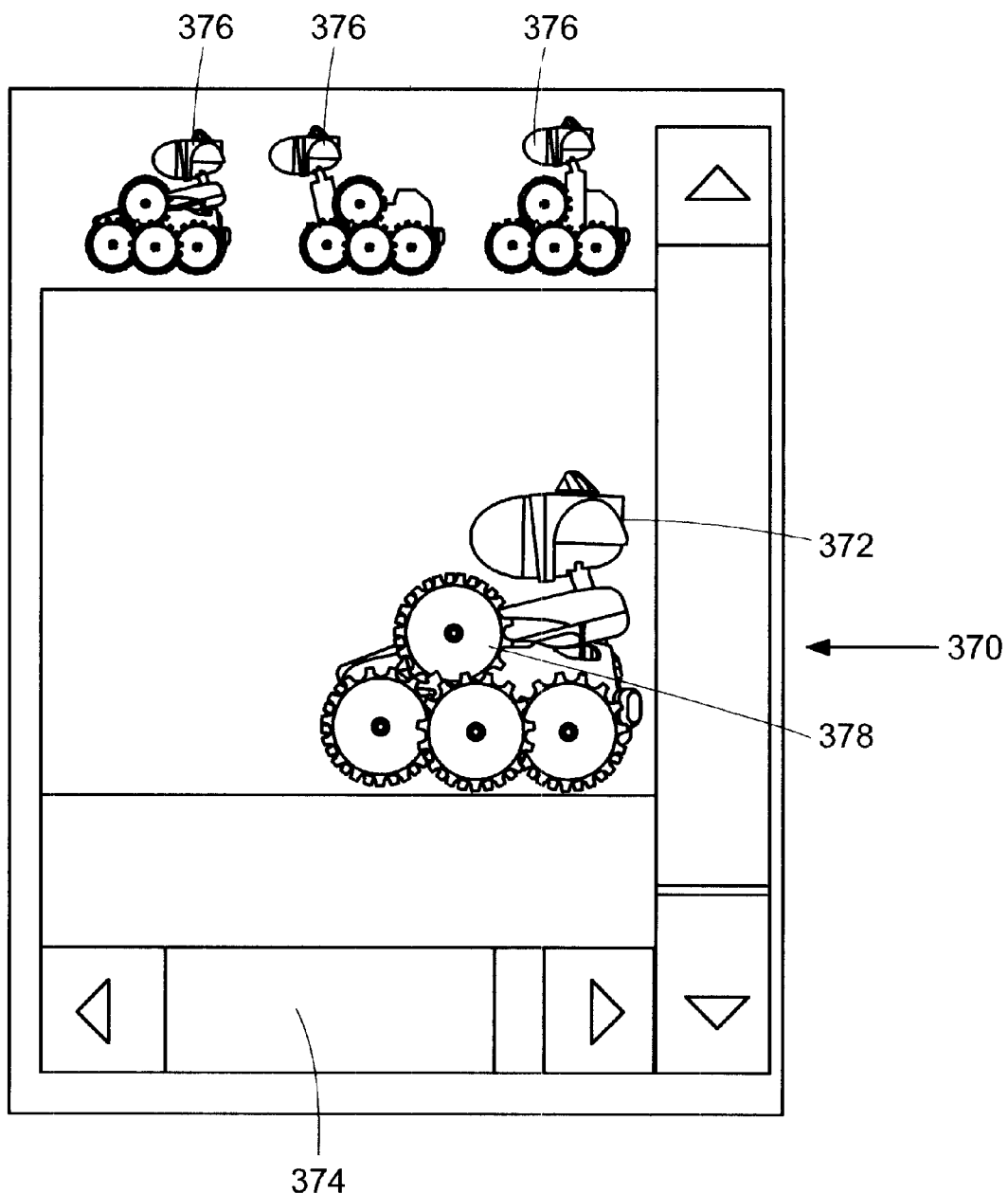
FIG. 10 depicts the pose, neck and head control portion of the user interface.

As described above, in the preferred embodiment, the camera 140 is mounted in the head 130 of the robot 100 and the height of the camera is adjusted by two factors: the angle of the neck element 120 of the robot and the extension of the "flipper" element 160 of the robot. While both of these factors are particular to the use of the iRobot-LE, one of skill in the art will readily be able to adapt the controls disclosed herein to the particular embodiment. FIG. 10 shows a preferred embodiment in which slide bar controls are provided for controlling the neck angle 372 and the flipper position 374. An animated depiction of the robot 378 shows the current pose of the robot. In addition, three pose buttons 376 are placed above the animated robot. By clicking on these buttons, the robot is preprogrammed to assume the various poses depicted.

In other embodiments in which the pitch of a head element can be controlled, a vertical tape is provided, marked in degrees, which can be used to control head pitch. In such an embodiment, an indicator such as a small red arrow or triangle shows the current pitch. If the user clicks onto the tape, a new target indicator will be placed onto the pitch tape, and the head will immediately begin to rotate up or down to the newly specified pitch. When the head reaches that pitch, the target indicator will disappear. One of skill in the art will recognize that controls will be adapted to the particular robot or vehicle.

One of skill in the art will immediately recognize that the user interface described above can be implemented on a personal computer or a handheld device with a liquid-crystal display such as a PDA computer or mobile phone.

As introduced above, the heads-up display 310 contains various overlays to provide information to the user 200 useful for remotely controlling a robot. As described above and seen in FIG. 4, even when the mouse-controlled cursor is not within the heads-up display window, the camera reticle 312, floor plane grid 314 and rotation tapes 316 and 318 are visible. In other embodiments, these can be omitted or selectively shown. For example, the user interface may only include these overlays when the robot is in drive mode.

When using the heads-up display to remotely control the movement of the robot, additional overlays can be provided. Navigating a robot with two-dimensional video information can be difficult, as the objects within the field of view many not provide the user with the visual clues necessary for accurate navigation. This is especially true when selecting a waypoint or target a significant distance from the robot. The preferred embodiment of the present invention includes a variety of overlay guidelines to provide the user with additional information on perspective, distance and viewing angle.

Figure 4:
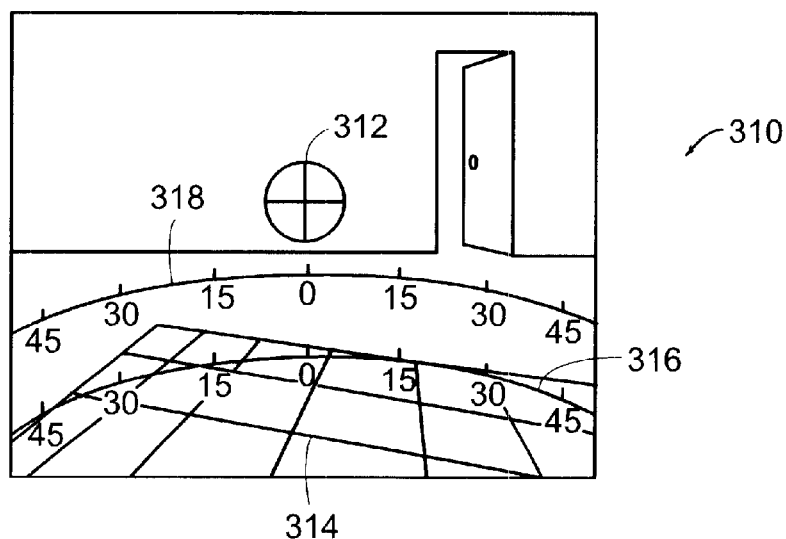
FIG. 4 depicts the detail of the heads-up display portion of the user interface.

In the preferred embodiment, as seen in FIG. 4, a green plane grid 314 is overlaid in front of the robot with squares 0.5 m by 0.5 m. The grid 314 extends along the entire horizontal axis of the heads-up display 310 and covers only the 1 m of area immediately in front of the robot. One of skill in the art will recognize that the dimensions of the grid should be chosen to match the mobility characteristics of the robot and the users preferences. The grid 314 provides the user an indication of the relative distance of various objects within the field of view. In the preferred embodiment, the user interface 300 assumes that the robot is operating on level ground. In other embodiments, data from the robot on the inclination of the ground plane can be used to adjust the grid 314 as necessary.

While the grid 314 provides generalized perspective information for the user, two additional overlays are used to assist the user in accurately choosing a waypoint as a target for the robot: targeting circles and the perspective box.

Figure 11:
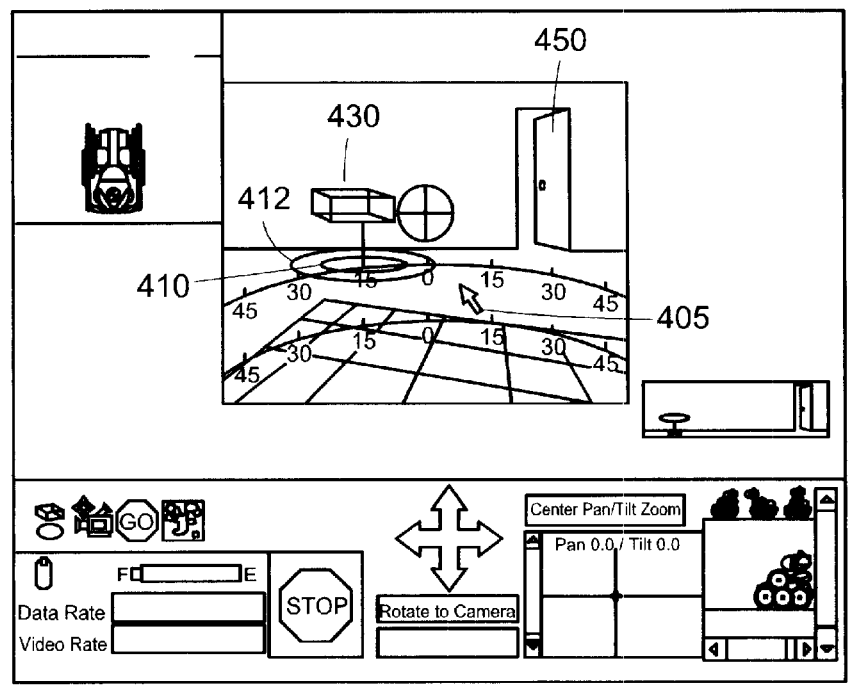
FIGS. 11–14 show sequential depictions of the heads-up display as a waypoint (or target) is selected and the robot moves to the target location.

Targeting Circles. As seen in FIG. 11, as the curser arrow 405 is moved within the heads-up display 310, one or more projections are overlaid on the heads-up display representing the area to which the robot will move if a particular waypoint is selected. In the preferred embodiment, this area is represented by one or more targeting circles 410 and 412, although the area could be represented by any shape (in two or three dimensions) including a shape chosen to approximate the dimensions and contours of a particular robot. The targeting circles 410 and 412 appear as ovals on the heads-up display due to the perspective of the current view. In the preferred embodiment, two concentric circles are used for targeting. The inner circle 410 is approximately the dimension of the robot and the outer circle 412 provides a looser approximation of the target based on inaccuracies inherent in the robotic system. In the preferred embodiment, the radii of these circles 410 and 412 remain constant in real terms (the circles do, however, appear to get smaller as the waypoint is at a greater distance from the robot); in other embodiments, the outer circle 412 might coincide with the inner circle 410 for waypoints near the robot and diverge as the waypoint distance increases.

Perspective Box. Even with targeting circles or similar projections, it can often be difficult for the user to gauge the selection of a waypoint. This is often the case in robotic systems incorporating a camera at a variable height and with additional pan, tilt and zoom controls. In order to further assist the user, the preferred embodiment includes a perspective box 430 overlaid on the heads-up display 310. In the preferred embodiment, the perspective box 430 is 0.5 m above the current waypoint, with the top and the bottom of the perspective box parallel to the plane of the floor. In the preferred embodiment, the perspective box 430 is a wire-frame overlay 0.5 m wide, 0.5 m deep and 0.25 m tall. When the camera is located at the same height as the perspective box, the top and bottom of the box will not be visible. In another embodiment, the height of the perspective box is continually adjusted to be 0.25 meters below the height of the camera. In this approach the perspective box never obscures the user's view of the horizon.

Finally, in the preferred embodiment, a 0.5 m line is drawn from the center of the targeting circles to the center of the bottom side of the perspective box to provide additional guidance to the user.

3. Preferred Method of Webdriving

FIGS. 11–14 depict the heads-up display portion of the user interface while performing an embodiment of the method of the present invention. In FIG. 11, the heads-up display 310 contains the view from the robot's environment through the video transmitted from the robot's camera. As viewed through the robot, there is a door 450 approximately five meters in front of the robot and slightly to the right of the robot. In FIG. 11, the camera 140 is facing directly forward, as indicated both by the pan cursor 362 and by the rotation bars (e.g. the camera reticle 312 matches up with the zero degree mark on the rotation bars 316 and 318). As the user moves the cursor arrow 405 within the heads-up display, the user interface constantly redraws the targeting circles 410 and 412 and the perspective box corresponding to the location of the cursor arrow 405. As the user moves the cursor around the heads-up display, the user is able to choose a waypoint.

Figure 12:
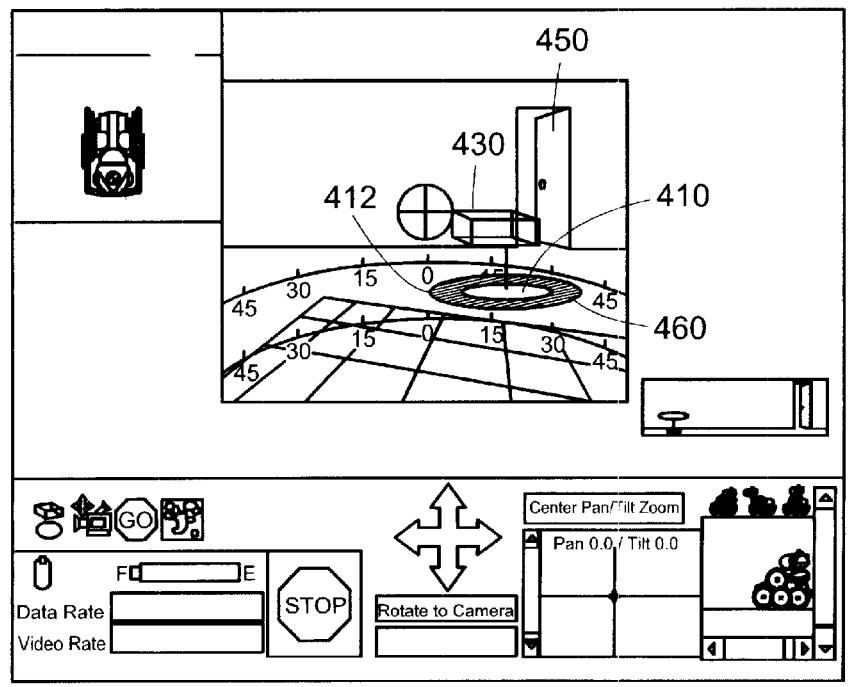

FIG. 12 shows the heads-up display immediately after a waypoint has been selected by clicking the mouse within the heads-up display window. In the preferred embodiment, once the waypoint 460 has been selected, the waypoint is added to the set of current waypoint drive targets and the targeting circles 410 and 412 are shaded. If the waypoint is the only current waypoint (or the waypoint at the top of the waypoint list), the robot begins to move toward the selected waypoint 460. In other words, if the waypoint drive list was empty prior to the recent selection and the robot is in drive mode, then the robot will begin to drive towards that waypoint. If an additional selection is made, a second waypoint may be added to the list. As the robot gets to a waypoint, that waypoint will disappear from the heads-up display. If there are further waypoints in the current waypoint list, then the robot will immediately begin driving towards the second waypoint.

Figure 13:
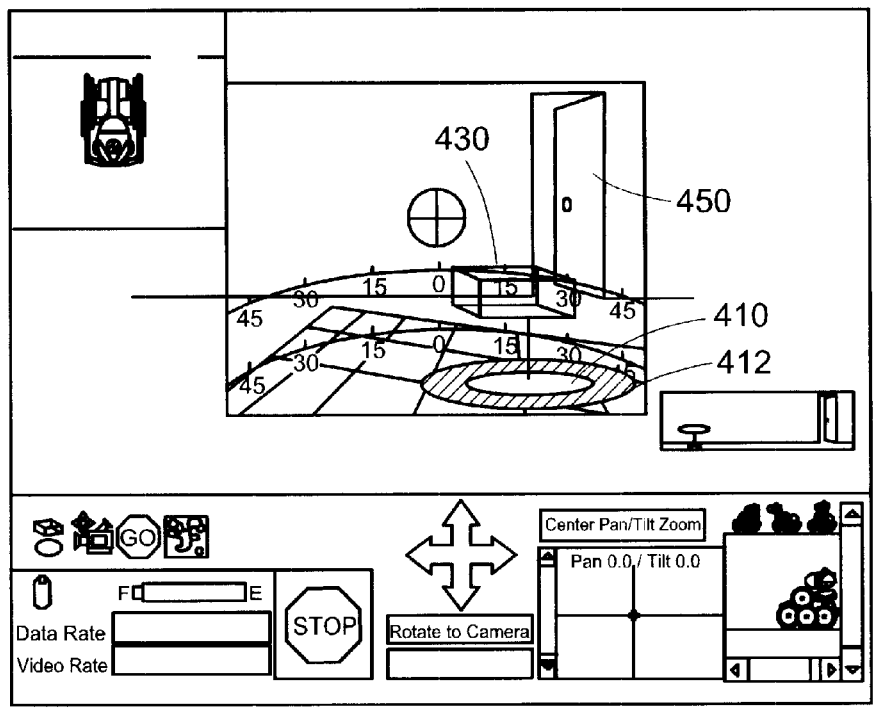
Figure 14:
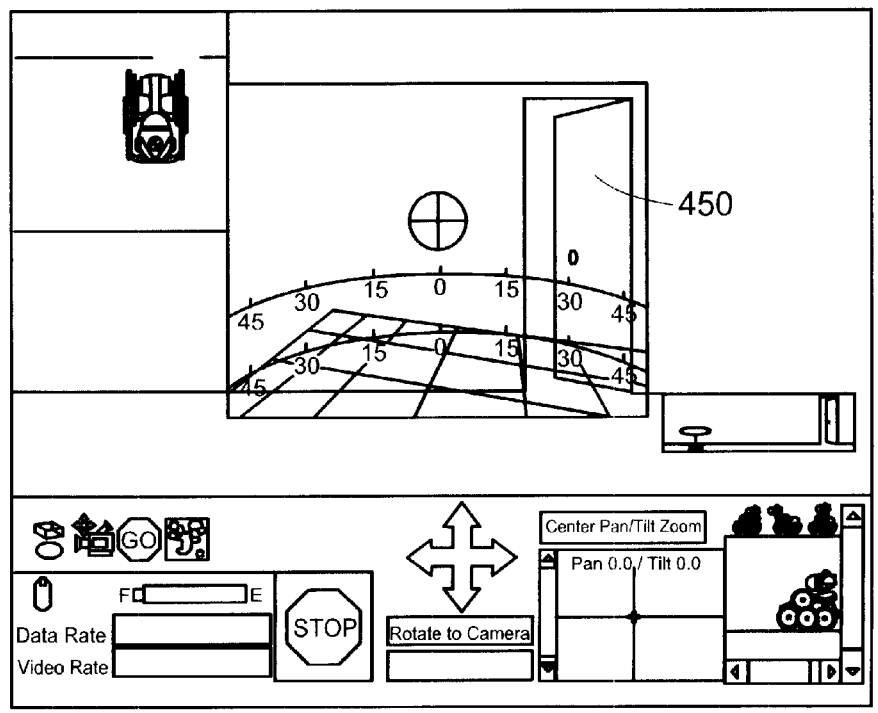

FIG. 13 shows the heads-up display 310 as the robot moves toward the selected waypoint 460. As the robot approaches the waypoint, the targeting circles remain shaded but appear to increase in size. The perspective box also increases in size, accurately depicting a three-dimensional perspective on the box. FIG. 14 shows the heads-up display as the robot reaches the waypoint, just outside of the door 450. The targeting circles and perspective box are removed from the heads-up display as the robot awaits further remote control instruction.

In certain embodiments, the waypoints are chosen by grabbing an icon from a waypoint bin and moving it to the desired target location within the heads-up display. This is done in much the same manner as one drags an object such as a file into a folder in a standard computer desktop. In other embodiments, a right click on the waypoint icon can lead to a pop-up menu of the available actions to be taken on a selected waypoint.

In addition, the robot can perform additional behaviors at higher or lower priorities than driving to the next waypoint as dictated by the design of the particular system. In a preferred embodiment, the robot uses its on-board sonar scanner 135 and infrared detectors (located within the robot body 125 but not shown) to perform obstacle avoidance. In that case, the existence of an obstacle (and the running of the obstacle avoidance routines) will take priority over the waypoint driving, causing the robot to swerve away from the obstacle in order to go around it. Such a system is particularly advantageous in the context of controlling a robot without the guarantee of real-time data transmission and a robot operating in a dynamic environment. A number of obstacle avoidance routines are well-known in the art. In the preferred embodiment, the many alternative movement commands are generated from behaviors that correspond to driving towards a waypoint, swerving around an obstacle, and even backing up to avoid a very close obstacle. Each of these commands given a priority by the behavior code that proposes that movement action. The priorities and even the magnitudes of these commands are then adjusted depending on whether they would move the robot into contact with an obstacle or near an obstacle, and with regards to other criteria such as whether the proposed movement would cause too sudden or jerky of a movement. The proposed motion with the highest priority after adjustment is then given as the current command to the motion controllers. This process happens many times per second. In other embodiments, the robot may release its current waypoint in the presence of an obstacle and await further instructions from the user (i.e. exit drive mode). In certain embodiments, the user is able to remotely control the level of sensitivity to obstacles, including selecting an icon to override an obstacle detection and continue in drive mode.

4. Computational Details

As the organization, design and method of using the method and system for remotely controlling a robot having been described in detail, I now turn to the method of preferred embodiment to convert the user's selection of a target within the heads-up display to a target position for the robot. The process of performing the conversion from a click location within the heads-up display to a target location for the robot requires (a) determining the current position and orientation of the robot; (b) determining the current position of the camera (or other device used for providing image information representative of the region around the robot); (c) determining the click vector (i.e. location on the heads-up display in relation to the camera); and (d) projecting the click location into the three dimensional global map to produce a target location. The preferred method of performing these steps is discussed below.

In the preferred embodiment, the system or method tracks the robot's location in a global map based upon a coordinate system external to the robot. In other embodiments, a robot coordinate system could be used. For the purposes of the preferred embodiment, the method and system assume that the robot's nominal location is a single point fixed at the robot's center of rotation. The start location for the robot can then be represented as $x_0$, $y_0$, $z_0$. In the preferred embodiment, the robot is assumed to travel on a purely horizontal surface and therefore the plane of the ground is assumed to be a constant ($z_0=0$).

Figure 15A:
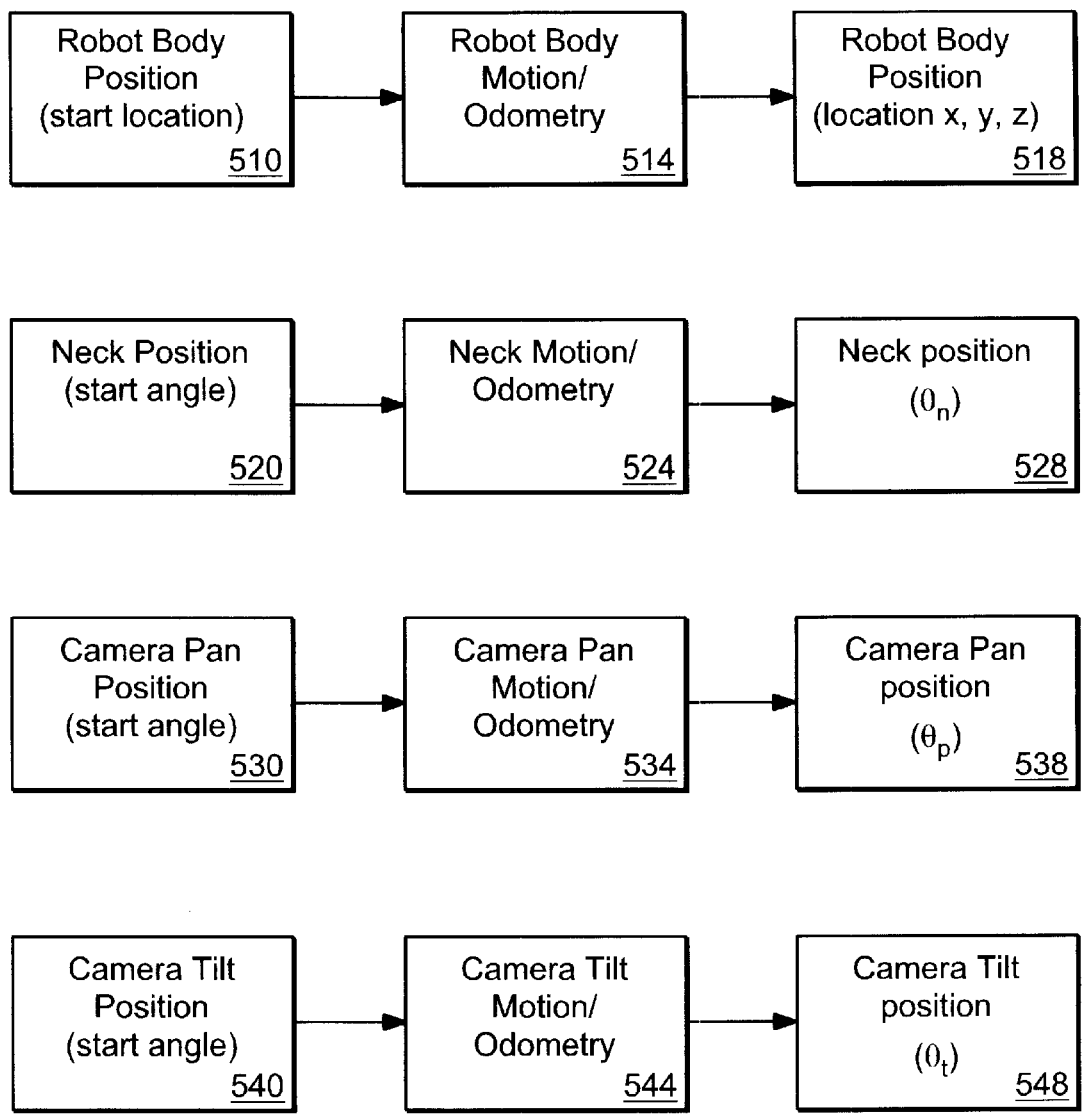
FIGS. 15A and 15B provide flow diagrams showing a preferred method of selecting a target location from a selection within the heads-up display.

FIG. 15A contains a flow diagram of the calculation of the robot's current positions. Because the robot may be moving at any given time—for example, moving towards the first in a series of selected waypoints—the preferred embodiment of the present invention tracks the current position of the robot by calculating its start location and tracking the robot's movement. In the preferred embodiment, the robot's movement is determined through the use of motor encoders. By combining information from the start location of the robot body 510 with the movement of the robot body (as tracked by encoders) 514, the robot body's odometry is calculated as a current location $x_t$, $y_t$, $z_t$ given time t. Odometry is simply one method of determining the robot's location by counting the rotation of the motors and other means are well-known in the art. This means of determining location is prone to some measure of error due to wheel slippage, which can vary greatly on different surfaces. In other embodiments, various methods of determining the robot's location can be used, including triangulation (local or GPS), localization, landmark recognition or computer vision.

In the preferred embodiment, as discussed above, the robot's camera 140 (with camera lens 145) is mounted at a controllable height above the robot's body 125 as controlled by the movement of the neck 120. At the top of the neck 120, a pan/tilt camera 145 is mounted.

The neck 120 contains a physical neck index switch that allows the system to reset the neck location in an absolute sense as the neck's movement passes through a specified location. By using the starting angle of the neck 520 and motor encoders 524, the angular location of the neck ($\theta_n$) at any given time can be calculated 528. Likewise, the pan position of the camera (538) and the tilt position of the camera (548) can be calculated using the start locations (530 and 540, respectively).

Figure 15B:
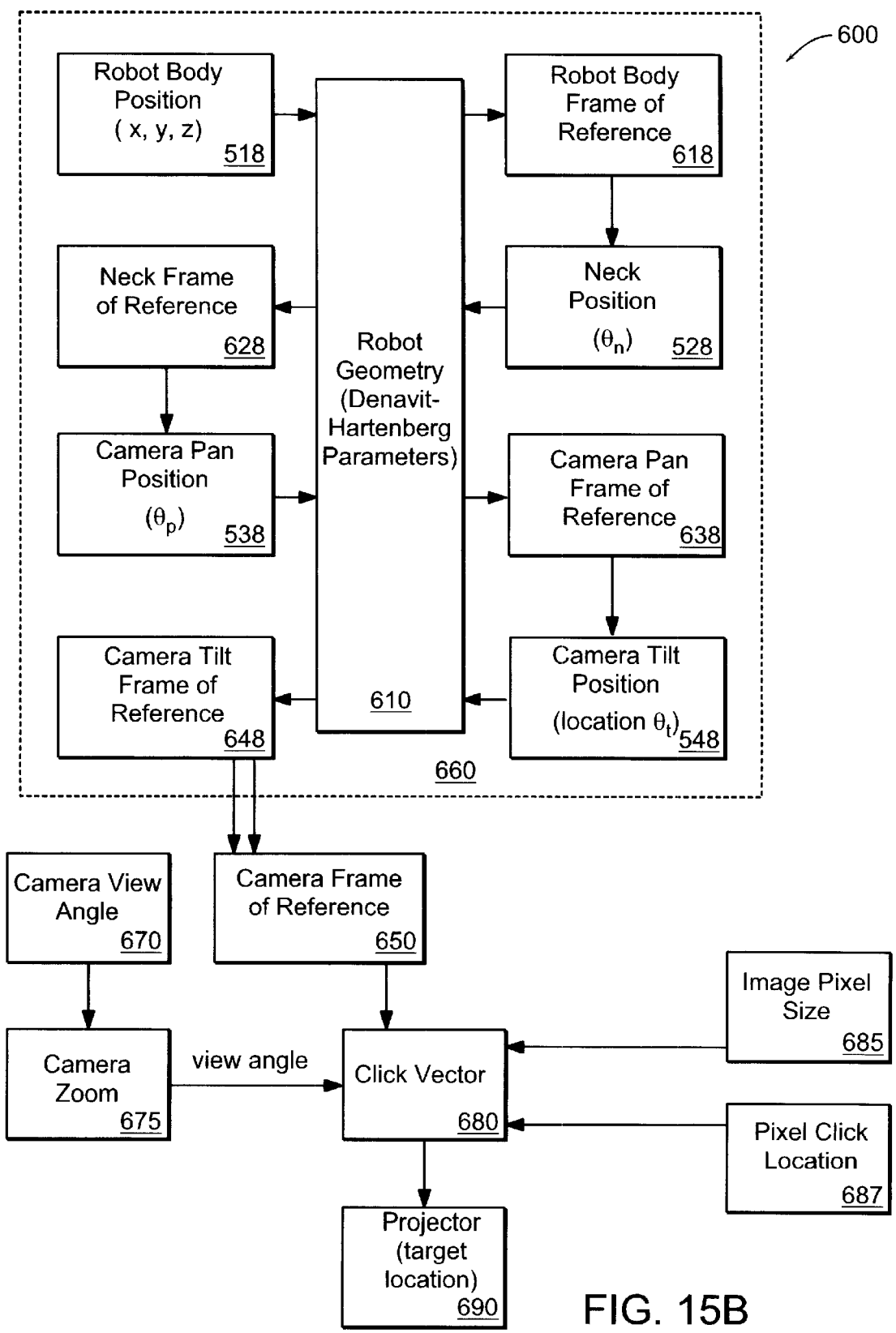

As seen in FIG. 15B, by using the current locations of each of the robot elements (body, neck, pan & tilt) and using the static geometry of the robot itself 610 (for example, the length of the neck and its arc of travel, the distance from the center of rotation to the base of the neck, etc.), it is possible to produce a frame of reference for each robot element. In this case, each frame of reference is represented by a 4 by 3 matrix giving the x, y, z location of the robot element and the rotation vectors for forward, left and up. For example, when the robot body is at location $x_t$, $y_t$, $z_t$ and the robot is orientated along the x-axis, the robot body's frame of reference is:

$$\begin{pmatrix} x_t & y_t & z_t \\ 1 & 0 & 0 \\ 0 & 1 & 0 \\ 0 & 0 & 1 \end{pmatrix}$$

A seen in FIG. 15B, a similar frame of reference can be created for each element in turn, going from the robot base toward the camera location. For example, the frame of reference for the neck 628 can be computed using the body frame of reference 618, the Denavit-Hartenberg Parameters describing the neck geometry 610 and the current neck angle of rotation ($\theta_n$) 528. Using these three inputs, one can compute a new frame of reference for the neck 628. Similarly, the pan frame of reference 638 is calculated, then the tilt frame of reference 648. Herein, because the camera 140 is attached to the end of the tilt element 160, the frame of reference for the tilt element 648 is the frame of reference for the camera itself 650.

We now have the robot's location and vector (frame of reference) 618 and the camera's location and vector (frame of reference) 650; the next step in the preferred embodiment is the determination of a click vector 680. In order to determine the click vector 680, the system must determine the view contained within the heads-up display (steps 670 and 675) and get a click location (steps 685 and 687). In order to determine the view contained within the heads-up display, the system uses the camera fixed angles and the camera zoom. In the preferred embodiment, the camera's angles are approximately 98° wide and 88° tall and the camera has a 8× zoom. The zoomed view angles (horizontal and vertical) are then determined by dividing the view angles by the current zoom. In the preferred embodiment, a pinhole camera model is again assumed for simplicity.

In order to determine the click location, the system looks to the image pixel size 685 and the pixel click location 687. The image pixel size is determined by the dimensions of the heads-up display 310 on the monitor in pixels, which defaults to four hundred pixels by three-hundred and twenty pixels in the preferred embodiment. The pixel click location is determined by the user's click location within the heads-up display, in other words the cursor position when the point-and-click device is activated. (In other embodiments, the click location is the location at which an icon is dropped in order to set a target location for the robot.)

A click vector (or click frame of reference) can then be calculated using the view angles, the image pixel size and the pixel click location. First, the image pixel size 685 and pixel click location 687 are used to determine the percentage offsets from the center of the image. For example, for a click in the upper-right-hand quadrant of the heads-up display, the system might calculate that the click location is 40% of the distance from the center to the vertical limit and 85% of the distance to the right side horizontal limit. That percentage, multiplied by the camera's horizontal and vertical zoomed view angles, provides the camera frame horizontal and vertical offset angles from the current camera frame of reference. Using the same methodology as in the Denavit- Hartenberg Parameters—but assuming zero length axes—a new click frame of reference 680 is generated.

We then reorient the click frame of reference to remove any roll. That is, we rotate the click frame of reference around the forward vector until the left vector is horizontal to the z ground plane. Once done, the directionality of the click frame of reference is fully represented by a vertical tilt angle and a horizontal rotation angle. This is the click vector.

The click vector is then projected (step 690) into the global map in order to determine the x, y, and z coordinates of the target location using trigonometric functions. In the preferred embodiment, z for the target is assumed to be zero. The robot is then able to use the global map to move from its current location to the target location.

In the preferred embodiment for a robot with a differential drive, the process for creating instructions to move the robot from its current location (518) to the target location (690) involves commanding forward and rotational velocities, where the rotational velocity is the sine of the difference between the current robot rotational angle and the angle between the current robot position and the desired robot position. The forward velocity is the cosine squared of the same angle. One of skill in the art will recognize that alternate steering and navigation methods mechanism can be created.

Above is described the preferred method (600) of converting a click location (687) to a target location for the robot (690). However, in order to provide the overlay guidelines (including the targeting circles and the perspective box), the system must be able to convert target locations (or any location within the global map) to pixel locations within the heads-up display. Much of the data necessary to make this conversion is duplicative of the data from the process shown in FIG. 15B of converting a click location to a target location.

In the preferred embodiment, the targeting circles (fixed within the global map) are continually refreshed on the heads-up display as the robot approaches the target location. Therefore, assuming a constant camera zoom angle and vector, the targeting circles should appear to increase in size as the robot's current location approaches the target location. It is important to note that in this process the x, y, z location of the targeting circle remains constant, but the camera's frame of reference changes with the robot's movement.

Figure 16:
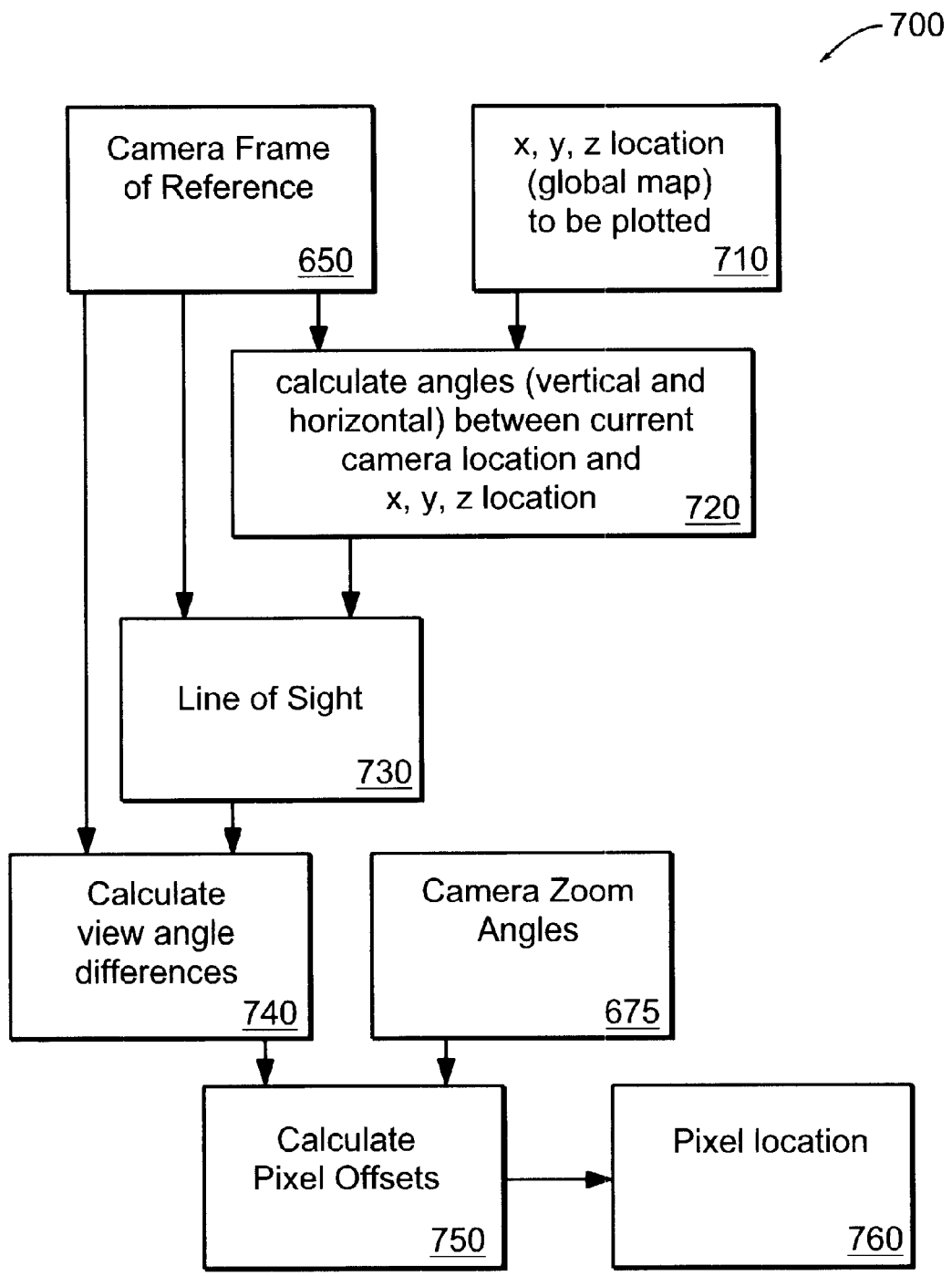
FIG. 16 contains a flow diagram showing the process of generating pixel locations within the heads-up display corresponding to locations within the global map.

One method 700 for the calculation of the pixel location within the heads-up display for a given x, y, z location in the global map is shown in a flow diagram in FIG. 16. First, an animation vector 720 is determined, such that the animation vector equals the angle between the current camera location and the x, y, z location to be mapped. This animation vector is represented by a vertical tilt angle and a horizontal rotation angle. A line of sight 730 is then determined by mapping the animation vector into the same roll component as the camera frame using the camera frame of reference. The horizontal and vertical differences 740 between the camera frame of reference and the line of sight provide horizontal and vertical view angle differences. These view angle differences 740 combined with the zoomed camera angles 675 provide pixel offsets 750 which can be mapped into the heads-up display 760, provided those angle offsets are within the current zoom.

This present invention provides the generic ability to "point at something" through a tele-robotic interface. The particular embodiment of this invention described herein allows the user to point at a spot on the floor and the robot will drive on top of that spot. However, the techniques described herein could also be used to point to a spot on a wall, given the plane of a wall, or to point at a specific item in a crowded collection of tparts, given a three-dimensional range map of the items being looked at, such as is provided by existing commercially available 3D-stereo vision products. As such, this interface could be used with a robotic arm to point to things to grasp. For example, the present invention could be used as part of a grocery shopping robot that picks items up off shelves, with this interface being used to point out the item to be selected. Since this interface is built using homogeneous transforms that fully represent three-dimensional space, this interface could be used on robots that do not traverse over flat floors, but work in arbitrary three-dimensional spaces. For example, this could be used to direct underwater robots, space-based robots, or airborne robots. This invention embodies the generalized technique of presenting pictures to end users, allowing them to point within those images, and then automatically using three-dimensional information to interpret that two-dimensional click as either a vector in three-dimensional space or as a spot in three-dimensional space where that vector intersects with planes, with surfaces in three-dimensional maps or with other three-dimensional representations of space.

With this in mind, it will be appreciated by those skilled in the art that the present invention may be practiced in connection with details that differ from the specific examples of implementation set forth herein, and can be implemented in devices, systems and methods differing from those shown. Thus, the details set forth herein are provided by way of illustration rather than limitation, and the invention is limited only by the scope of the appended claims.

I claim:

1. A method for tele-operating a robot in an environment, comprising the steps of:

providing a user interface for controlling the tele-operation of the robot;

providing, via an imaging device associated with the robot, image information representative of the environment around the robot to the user interface;

using the image information to provide a user-perceptible image at the user interface representative of the environment around the robot;

designating a target anywhere in the user-perceptible image towards which the robot will move;

automatically converting the target designated in the user-perceptible image into a target location having x, y, and z coordinates in the environment of the robot at the user interface; and providing real-time instructions to the robot from the user interface to move from the robot's current location in the environment to the x, y, and z coordinates of the target location in the environment.

2. The robot tele-operating method of claim 1 wherein the converting step for each designated target further comprises the steps of:

determining a current frame of reference of the robot in the environment;

determining a current frame of reference for the imaging device associated with the robot;

identifying one end of a click vector based upon the current frame of references of the robot and the imaging device;

determining the other end of the click vector based upon the view of the user-perceptible image and the designated target; and projecting the click vector onto a three-dimensional global map of the robot's environment to provide the x, y, and z coordinates of the target location.

3. The robot tele-operating method of claim 2 wherein the click vector determining step further comprises the steps of:
   determining the fixed angle and zoom of the imaging device associated with the robot that provides the view of the user-perceptible image;
   determining the pixel size of the user-perceptible image;
   identifying a pixel location in the user-perceptible image corresponding to the designated target; and
   calculating the other end of the click vector using the fixed angle and zoom of the imaging device, the pixel size of the user-perceptible image, and the pixel location corresponding to the designated target.

4. The robot tele-operating method of claim 1 wherein the target designating step further comprises the steps of:
   moving a visible pointer to a location in the user-perceptible image corresponding to the designated target; and
   activating a point-and-click selection device at the location to select the designated target.

5. The robot tele-operating method of claim 1 wherein the target designating step further comprises the steps of:
   selecting an icon;
   dragging the icon to a location in the user-perceptible image corresponding to the designated target; and
   dropping the icon at the location in the user-perceptible image to select the designated target.

6. The robot tele-operating method of claim 1 wherein the user-perceptible image is provided on a computer monitor.

7. The robot tele-operating method of claim 1 wherein the user-perceptible image is provided on a portable liquid-crystal display.

8. The robot tele-operating method of claim 1 wherein the image information representative of the environment around the robot is provided by a video signal.

9. The robot tele-operating method of claim 8 wherein the video signal is transmitted via the Internet.

10. The robot tele-operating method of claim 1 wherein the imaging device is a camera.

11. A system for tele-operating a robot in an environment, comprising:
   a user interface for controlling the tele-operation of the robot;
   an imaging device associated with the robot for providing image information representative of the environment around the robot;
   means for transmitting the image information to the user interface;
   means for converting the image information to a user-perceptible image at the user interface;
   means for designating a target in the user-perceptible image towards which the robot should move;
   means for automatically converting the target designated in the user-perceptible image into a target location having x, y, and z coordinates in the environment of the robot; and
   means for providing real-time instructions to the robot from the user interface to move from the robot's current location in the environment to the x, y, and z coordinates of the target location in the environment.

12. The robot tele-operating system of claim 11 wherein the converting means comprises:
   means for determining the current frame of reference of the robot in the environment;
   means for determining the current frame of reference of the image device associated with the robot;
   means for identifying one end of a click vector using the current frames of references of the robot and the imaging device;
   means for determining the other end of the click vector based upon the view of the user-perceptible image and the designated target; and
   means for projecting the click vector onto a three-dimensional global map of the robot's environment to provide the x, y, and z coordinates of the target location.

13. The robot tele-operating system of claim 12 wherein the means for determining the other end of the click vector comprises:
   means for determining the fixed angle and zoom of the imaging device associated with the robot that provides the view of the user-perceptible image;
   means for determining the pixel size of the user-perceptible image;
   means for identifying a pixel location in the user-perceptible image corresponding to the designated target; and
   means for calculating the other end of the click vector using the fixed angle and zoom of the imaging device, the pixel size of the user-perceptible image, and the pixel location corresponding to the designated target.

14. The robot tele-operating system of claim 11 wherein the target designating means is a point-and-click selection device that includes a visible pointer movable within the user-perceptible image and means for activating the point-and-click selection device such that the location of the visible pointer within the user-perceptible image when the point-and-click selection device is activated designates the target towards which the robot should move.

15. The robot tele-operating system of claim 11 wherein the target designating means comprises:
   means for selecting and dragging an icon to a location in the user-perceptible image corresponding to the designated target; and
   means for dropping the icon at the location in the user-perceptible image to select the designated target.

16. The robot tele-operating system of claim 11 wherein the imaging device is a camera.

17. The robot tele-operating system of claim 11 wherein the image-information transmitting means is the Internet.

18. A graphical user interface for tele-operating a robot in an environment, comprising:
   a display device for providing a user-perceptible image representative of the environment around the robot;
   means for designating a target in the user-perceptible image towards which the robot thould move; and
   means for superimposing at least one projection in the user-perceptible image in correlation with movement of the target designating means;
   wherein the at least one projection represents an area to which the robot may move prior to target designation and represents the area to which the robot will move upon target designation.

19. The graphical user interface of claim 18 wherein the at least one projection provided by the superimposing means is a targeting circle.

20. The graphical user interface of claim 18 wherein the at least one projection provided by the superimposing means is a targeting circle, and wherein said superimposing means is further operative to provide a perspective box associated with the targeting circle.

21. The graphical user interface of claim 18 wherein the target designating means comprises a visible pointer movable within the user-perceptible image and wherein the projection superimposing means is operative to superimpose the at least one projection over the visible pointer.

22. A graphical user interface for tele-operating a robot in an environment, comprising:

a display device for providing a user-perceptible image representative of the environment around the robot;

means for designating a target in the user-perceptible image towards which the robot should move; and means for overlaying a floor plan grid on top of the user-perceptible image to provide an indication of relative distance of objects within the environment of the robot based upon the robot's current position.

23. The graphical user interface of claim 22 further comprising:

means for overlaying at least one rotation tape on top of the user perceptible image to aid in tele-operating the robot.

\* \* \* \* \*